United States Patent
Brouwer et al.

(10) Patent No.: US 8,534,636 B2
(45) Date of Patent: Sep. 17, 2013

(54) MOUNTING CONSTRUCTION FOR AN OUTSIDE MIRROR UNIT

(75) Inventors: Stefan Frits Brouwer, Schoonhoven (NL); Paulus Gerardus Maria Van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 0 days.

(21) Appl. No.: 12/682,975

(22) PCT Filed: Nov. 14, 2008

(86) PCT No.: PCT/NL2008/050727
§ 371 (c)(1),
(2), (4) Date: May 20, 2010

(87) PCT Pub. No.: WO2009/064186
PCT Pub. Date: May 22, 2009

(65) Prior Publication Data
US 2010/0224753 A1 Sep. 9, 2010

(30) Foreign Application Priority Data

Nov. 14, 2007 (NL) ...................................... 1034697

(51) Int. Cl.
*A47G 1/24* (2006.01)
*B60R 1/02* (2006.01)

(52) U.S. Cl.
USPC .................. 248/476; 248/222.52; 248/475.1; 248/479

(58) Field of Classification Search
USPC ................. 248/466, 475, 488, 479; 296/1.11
See application file for complete search history.

(56) References Cited

U.S. PATENT DOCUMENTS

| 4,628,760 | A | * | 12/1986 | Huddleston | .................. 74/502.1 |
| 5,615,054 | A | | 3/1997 | Lang | |
| 6,511,116 | B1 | * | 1/2003 | De Jongh et al. | ............ 296/97.9 |
| 6,979,091 | B2 | * | 12/2005 | Ichikawa | ........................ 359/872 |
| 6,994,443 | B2 | * | 2/2006 | Schuurmans et al. | ........ 359/872 |
| 7,175,292 | B2 | * | 2/2007 | Flynn | ............................. 359/876 |
| 7,546,997 | B2 | * | 6/2009 | Van Stiphout | ................ 248/477 |
| 7,712,809 | B2 | * | 5/2010 | Lynam et al. | ................ 296/1.11 |
| 7,857,278 | B2 | * | 12/2010 | Yoshida et al. | ............... 248/479 |
| 2002/0001148 | A1 | * | 1/2002 | Fuchs et al. | ................... 359/872 |
| 2002/0024751 | A1 | | 2/2002 | Guttenberger | |

(Continued)

FOREIGN PATENT DOCUMENTS

DE    29 07 433 B1    9/1980

(Continued)

OTHER PUBLICATIONS

International Search Report dated Feb. 5, 2009 from WO 2009/064186.

*Primary Examiner* — Amy J Sterling
(74) *Attorney, Agent, or Firm* — Swanson & Bratschun, L.L.C.

(57) ABSTRACT

Mounting construction for mounting an adjustment instrument to a carrier for an outside mirror unit, comprising first mounting parts on the adjustment instrument and second mounting parts on the carrier, which mounting parts guide the adjustment instrument from a first position to a second position in a direction along the carrier, the mounting parts cooperating with each other in the second position to fix movement of the adjustment instrument relative to the carrier in a direction transverse to the carrier, while in the first position the adjustment instrument and the carrier are clear of each other.

20 Claims, 5 Drawing Sheets

(56) References Cited

U.S. PATENT DOCUMENTS

2003/0103142 A1* 6/2003 Hitomi et al. .................. 348/148
2006/0006305 A1* 1/2006 Fukai ........................... 248/466

FOREIGN PATENT DOCUMENTS

| DE | 43 02 950 A1 | 8/1994 |
| DE | 298 10 522 U1 | 10/1998 |
| DE | 103 58 263 A1 | 7/2005 |
| DE | 10 2004 002544 A1 | 8/2005 |
| EP | 1 170 174 A2 | 6/2001 |
| EP | 1 170 174 A3 | 6/2001 |
| FR | 2 504 075 A | 10/1982 |

* cited by examiner

MOUNTING CONSTRUCTION FOR AN OUTSIDE MIRROR UNIT

RELATED APPLICATIONS

This application is a 35 U.S.C. §371 national phase application of PCT/NL2008/050727 (WO 2009/064186), filed on Nov. 14, 2008, entitled "Mounting Construction for an Outside Mirror Unit", which application claims the benefit of Netherlands Application No. 1034697, filed Nov. 14, 2007, which are incorporated herein by reference in their entirety.

The invention relates to a mounting construction for mounting an adjustment instrument to a carrier for an outside mirror unit.

As is known, motor vehicles are provided with outside mirrors. Often, the reflecting part of these mirrors can be adjusted from inside the vehicle to optimize the view of the driver. To that end, an adjustment instrument is placed between the reflecting surface and a carrier included in the outside mirror. The reflecting surface can then, typically driven electrically, tilt about a horizontal or a vertical axis. The carrier is normally encased by a mirror cap, for esthetic and aerodynamic reasons. The adjustment instrument is normally connected to the carrier through screws. This screw connection has as a disadvantage that it takes some time for it to be effected. It is therefore economically useful to obviate the application of screws here, also because the screws themselves cost money. In addition, when applying screws, much can go wrong. Thus, a screw connection may fail because the screw is applied wide of the screw hole. A screw may be tightened insufficiently, so that the adjustment instrument with the reflecting surface attached thereto is not rigidly secured to the carrier and may vibrate. Also, a screw may eventually come loose in the mirror cap. The outside mirror may then start to rattle, which is experienced as a nuisance.

The invention contemplates a mounting construction of the type mentioned in the opening paragraph by which the disadvantages mentioned are prevented. To this end, the mounting construction for mounting an adjustment instrument to a carrier for an outside mirror unit comprises first mounting parts on the adjustment instrument and second mounting parts on the carrier, which mounting parts guide the adjustment instrument from a first position to a second position in a direction along the carrier, the mounting parts cooperating with each other in the second position to fix movement of the adjustment instrument relative to the carrier in a direction transverse to the carrier, while in the first position the adjustment instrument and the carrier are clear of each other. As a result, it is not necessary anymore to mount the adjustment instrument with screws, and all disadvantages of the use of screws are obviated.

Furthermore, the carrier is surrounded by a mirror cap and the adjustment instrument is provided with a reflecting surface, while the edge of the reflecting surface is so closely adjacent to the inside of the mirror cap that after placement of the reflecting surface on the adjustment instrument already mounted in the manner as described in the preceding paragraph, it is not possible anymore to displace the adjustment instrument back to its first position, because this is prevented by the cooperation between the outer edge of the reflecting surface and the inner edge of the mirror cap. The mirror may hence be circumferentially enclosed by the mirror cap.

The axial confinement can be obtained by at least two projections, one on the carrier and one on the adjustment instrument, which cooperate with each other in the second position, such that they prevent an axial displacement of the adjustment instrument along axis A.

The work to displace the adjustment instrument from the second position to the first position may be greater than the work in opposite direction. Preferably, this is achieved by a snap connection or a clamped joint or a glued joint. This is to prevent the possibility of the adjustment instrument, prior to placement of the reflecting surface, being inadvertently displaced back into the first position again, as a result of which the adjustment instrument might come off the carrier.

In addition, it is possible that during the rotation of the adjustment instrument an electrical connection is established between carrier and adjustment instrument, in order for the driving mechanisms present in the adjustment instrument to be supplied with energy.

It is also possible that through the rotation of the adjustment instrument a plug element fitted to the adjustment instrument to supply the driving mechanisms present in the adjustment instrument with energy is locked such that the plug element cannot be uncoupled anymore if the adjustment instrument is in the second position. Normally, during assembly of a complete mirror of a vehicle, first the plug element is fitted in the adjustment instrument, then the adjustment instrument is mounted on the carrier. For instance through snap hooks on the adjustment instrument, uncoupling of the plug element is prevented. These snap hooks are fragile and sometimes break off, so that uncoupling of the plug element sometimes cannot be prevented. It is therefore advantageous to arrange for this locking to come about differently, for instance by combining the locking with the displacement from the first position to the second position.

Further advantageous embodiments of the invention are described in the subclaims.

The invention also relates to an outside mirror unit comprising a mirror cap which surrounds a carrier, an adjustment instrument and a mounting construction for mounting the adjustment instrument to the carrier, while the adjustment instrument is provided with a mirror.

The invention will be further elucidated with reference to a preferred embodiment which is represented in a number of drawings.

Figure 1:
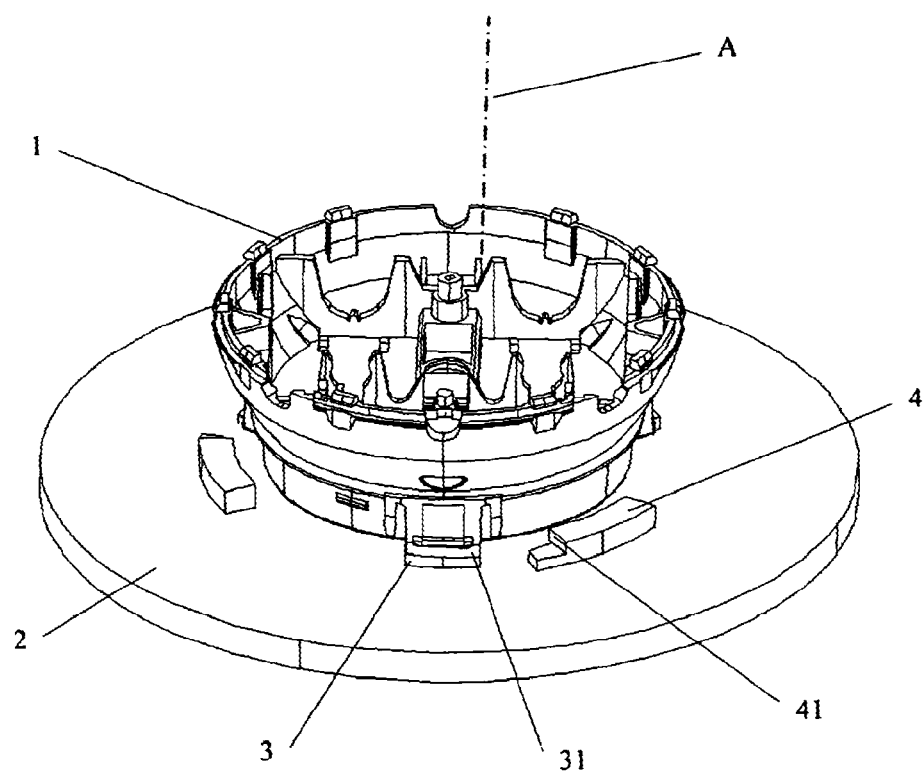
FIG. 1 represents the adjustment instrument on the carrier in the first position.

FIG. 1 shows the adjustment instrument 1 placed on the carrier 2. For simplicity, merely the lower part of the adjustment instrument 1 is represented. Also for simplicity, the mirror cap is not represented. In a preferred embodiment, the displacement is a rotation about an axis A. The rotation axis A extends substantially transversely to the plane of the carrier 2 and forms the central axis of a substantially circular adjustment instrument 1.

The adjustment instrument 1 is provided with a mounting part 3, here designed as a projection. The carrier 2 is likewise provided with a mounting part 4, here designed as a projection. The two projections 3 and 4 can cooperate with each other to mount the adjustment instrument 1 to the carrier 2.

The mounting parts guide the adjustment instrument 1 relative to the carrier 2 from a first position to a second position in a direction along the carrier 2. In the second position, the mounting parts 3, 4 cooperate with each other to fix movement of the adjustment instrument relative to the carrier in a direction transverse to the carrier 2. In the first position the adjustment instrument 1 and the carrier 2 are clear of each other.

Figure 2:
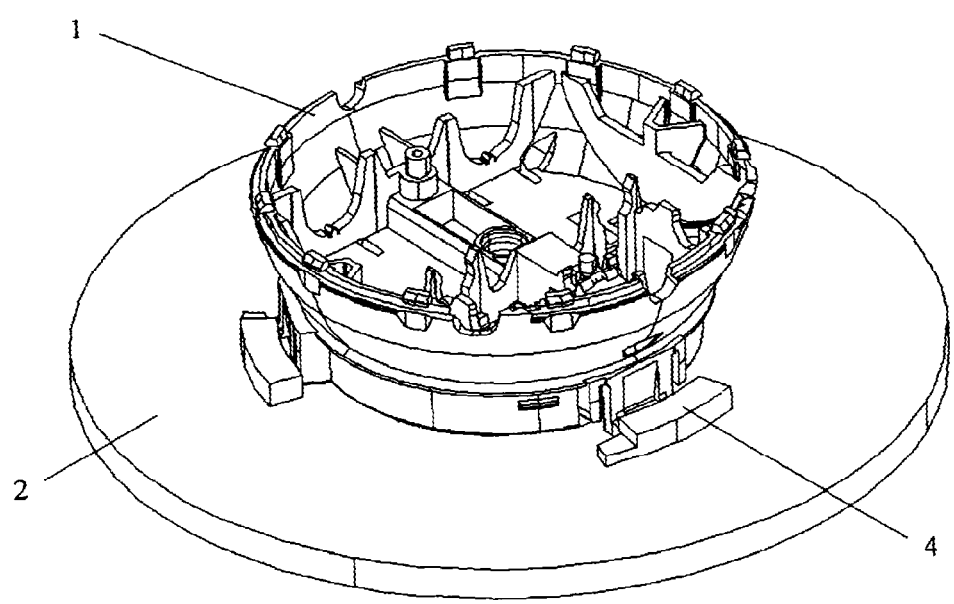
FIG. 2 represents the adjustment instrument on the carrier in the second position.

FIG. 1 also shows the projection 3 with top surface 31 on the adjustment instrument 1. In the preferred embodiment, the adjustment instrument 1 is provided with three projections 3 which are situated at a uniform distance and at an equal radius from the intersection of the axis A and the carrier 2, but this is not requisite. It is also conceivable that the projections 3 are situated at different radii from the intersection of axis A and the carrier 2. The top surface 31 of projection 3 cooperates with the bottom surface 41 of projection 4 on carrier 2, as will be elucidated with the help of FIGS. 5 and 6. FIG. 2 shows the adjustment instrument 1 on carrier 2 in the second position.

Figure 3:
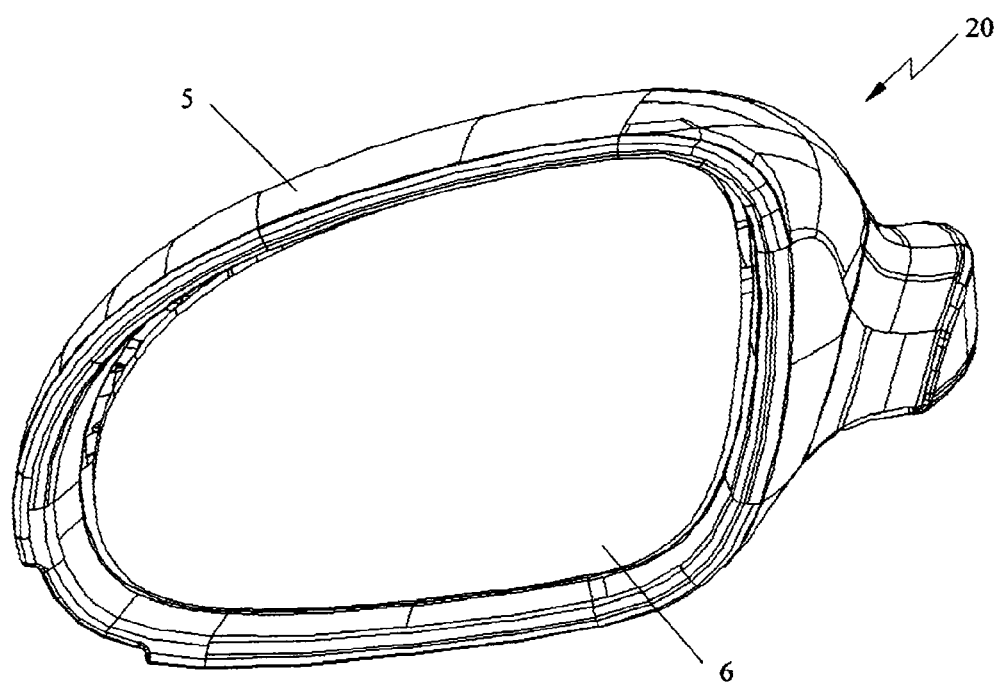
FIG. 3 represents the mirror cap with the reflecting surface.
Figure 4:
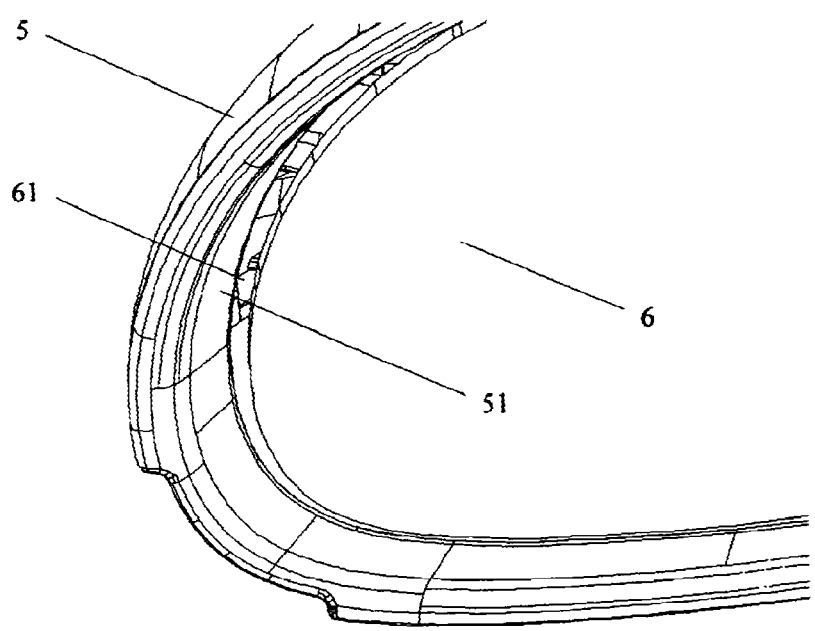
FIG. 4 represents a detail of the mirror cap and the reflecting surface.

FIG. 3 shows an outside mirror unit 20 with mirror cap 5 having therein a reflecting surface 6 mounted on the adjustment instrument 1, not shown. In this exemplary embodiment, the reflecting surface 6 is designed as a mirror. The detailed view in FIG. 4 shows that the outer edge 61 of the mirroring surface 6 is closely adjacent to the inner edge 51 of the mirror cap 5. Thus, after assembly of the reflecting surface 6 on the adjustment instrument 1, it is not possible anymore to rotate the adjustment instrument from its second position back into its first position. Since in this way the mirror 6 is confined in the mirror cap 5, the adjustment instrument 1 is thus locked.

Figure 5:
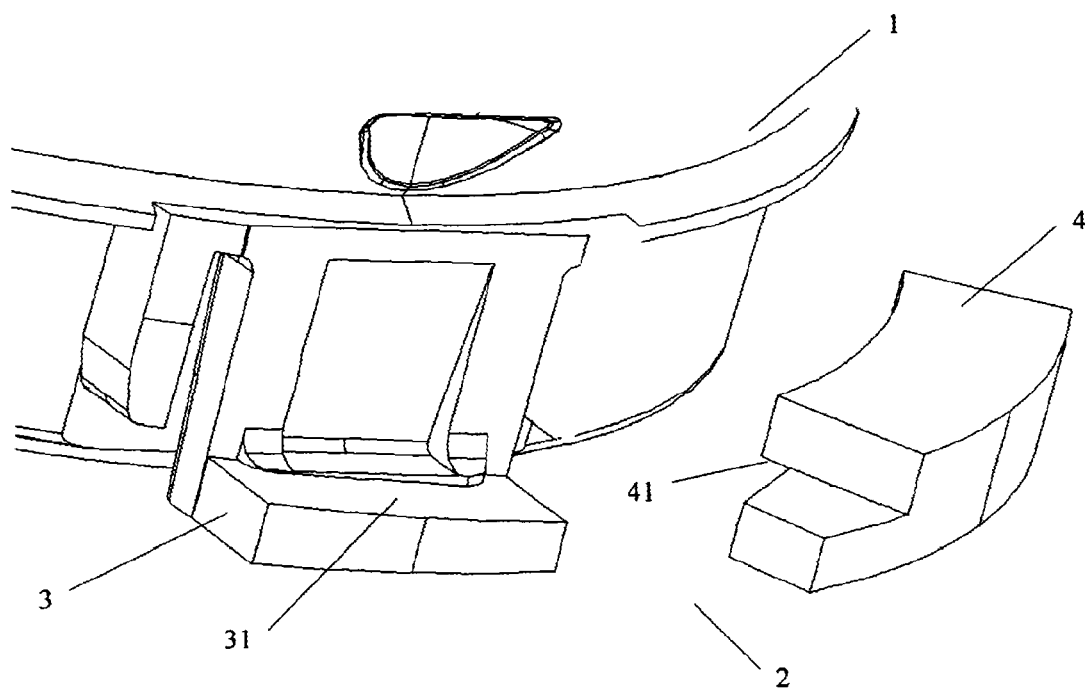
FIG. 5 represents the cooperating projections in the first position.
Figure 6:
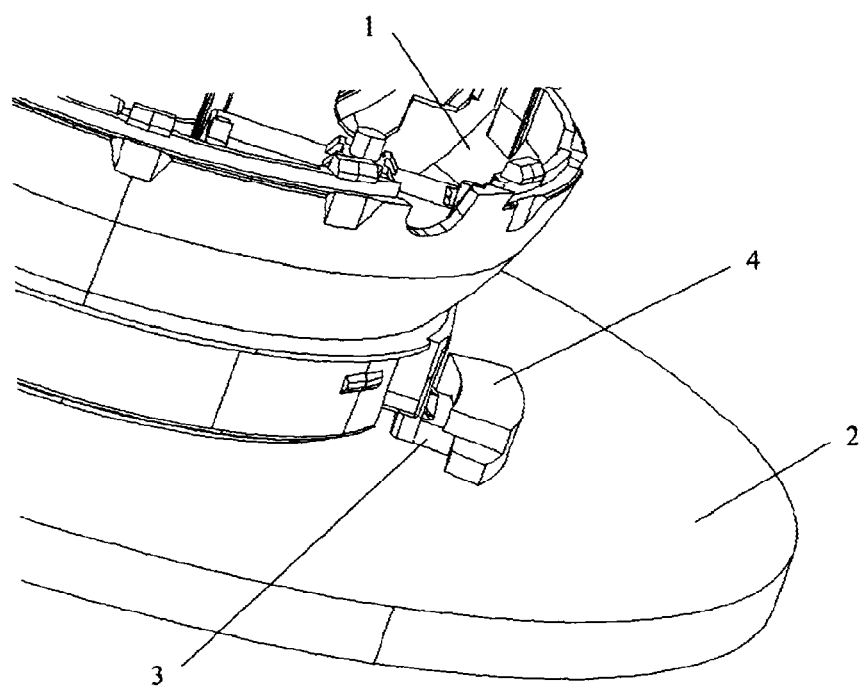
FIG. 6 represents the cooperating projections in the second position.

FIG. 5 shows projection 3 of the adjustment instrument 1 and projection 4 of the carrier 2 in the first position. In FIG. 6 it can be seen that upon rotation of the adjustment instrument 1 to the second position the top surface 31 of projection 3 slides under the bottom surface 41 of projection 4 and thereby prevents a displacement of the adjustment instrument 1 relative to the carrier 2 along axis A.

In a preferred embodiment, the mounting parts projection 3 and projection 4 apply a bias to each other, so that play is reduced, which can prevent possible rattling. This bias may be effected by a spring, but also for instance by elastic deformation of the projection material.

Figure 7:
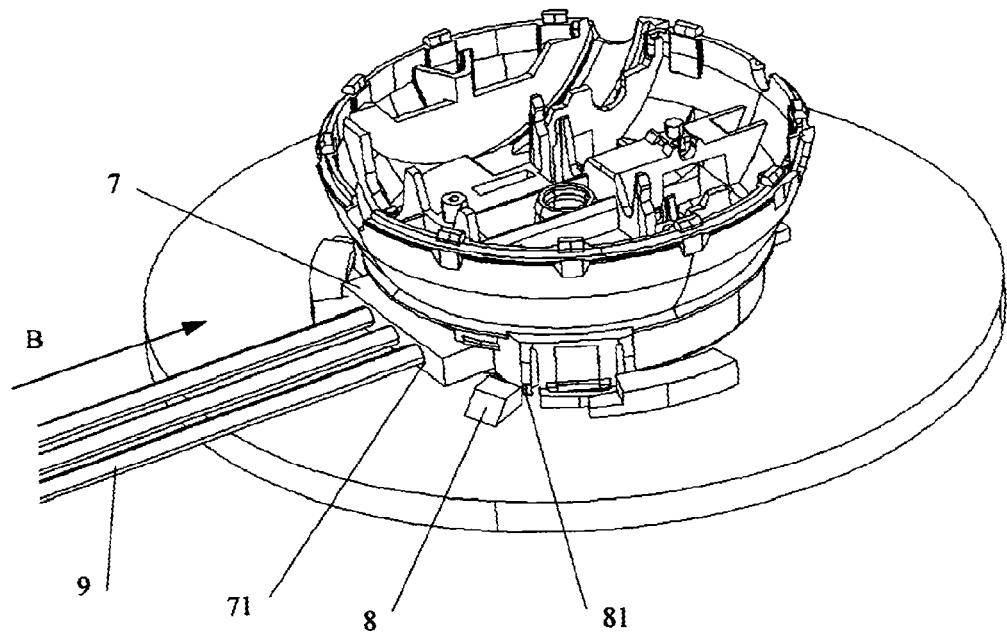
FIG. 7 represents the plug element in unlocked position.
Figure 8:
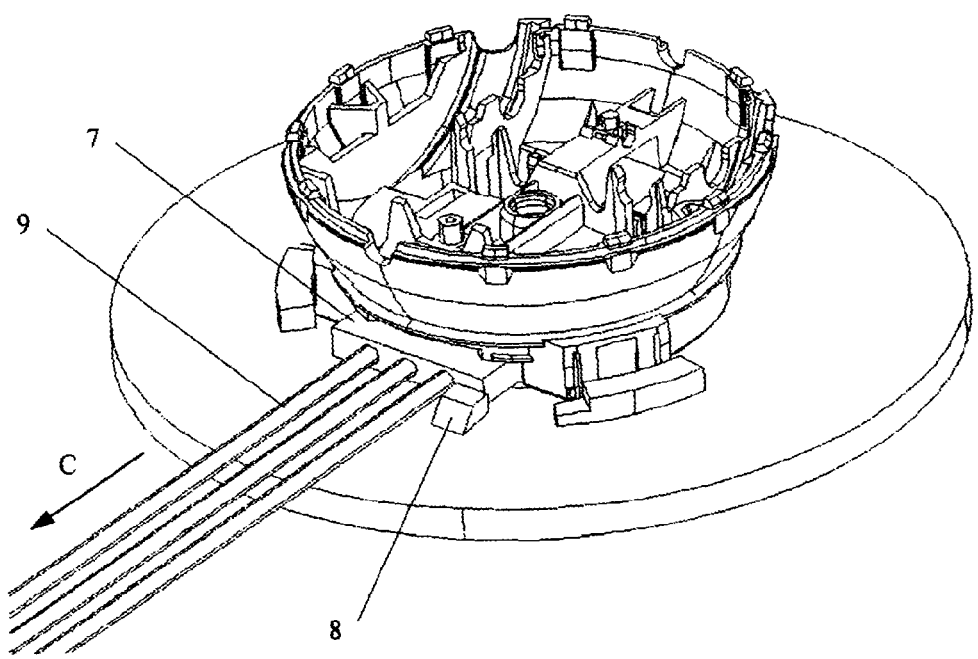
FIG. 8 represents the plug element in locked position.

FIG. 7 shows the adjustment instrument 1 in the first position with a plug element 7 mounted for the power supply. In the embodiment represented, this is a plug having three current carriers 9, but there may be more, for instance if the adjustment instrument 1 is provided with a memory function for the position of the reflecting surface 6. Prior to mounting of the adjustment instrument 1, the plug element 7 is fitted thereto in the direction of arrow B, whereby the power supply is effected in a manner known to those skilled in the art. Provided on the carrier 2 is a projection 8. Upon rotation of the adjustment instrument to the second position, the surface 81 of projection 8 facing the plug element 7 cooperates with surface 71 of the plug element 7, more specifically in such a manner that the plug element 7 is locked in the direction C, as can be seen in FIG. 8.

Figure 9:
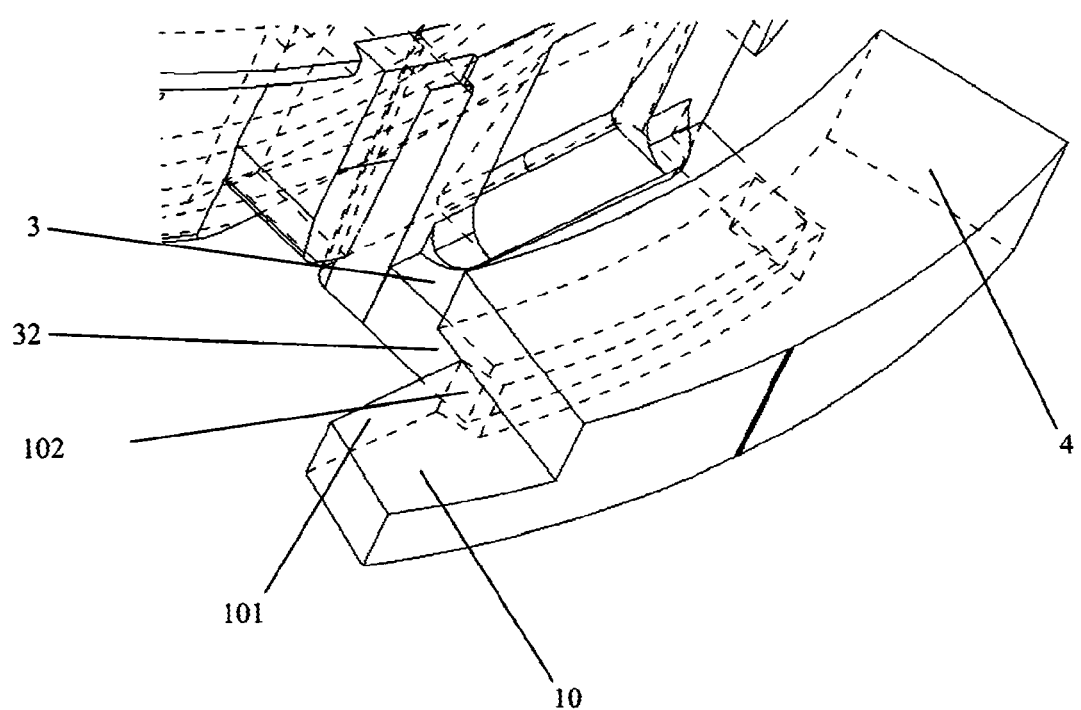
FIG. 9 represents a schematic detail view of a mounting construction according to the invention.

In FIG. 9 it is shown that the mounting parts 3 and 4 comprise a snap connection. In this exemplary embodiment, the snap connection is designed as a recess 102 in the projection 4. The projection 4 is also provided with a run-on surface 101 along which the projection 3 is guided towards the recess 102. The adjustment device 1 is thereby locked with respect to the carrier 2 in the second position.

It is noted that the invention is not limited to the exemplary embodiments represented here. Many variations are possible within the scope of the invention as set forth in the following claims.

The invention claimed is:

1. A mounting construction for mounting a mirror adjustment instrument to a planar surface of a carrier in an outside mirror unit, comprising a mirror cap surrounding and encasing the carrier, said mirror adjustment instrument being arranged for tilting a reflection surface mounted thereon about a horizontal and vertical axis with regard to the mirror cap, said mirror cap surrounding and encasing the mirror adjustment instrument, said mounting construction comprising first mounting parts on the mirror adjustment instrument for adjusting a reflecting surface mounted on the mirror adjustment instrument and second mounting parts on the planar surface of the carrier surrounded by and encased by the mirror cap, which mounting parts guide the mirror adjustment instrument from a first position to a second position in a direction along the planar surface of the carrier surrounded by and encased by the mirror cap by rotation about an axis transverse to the carrier, the mounting parts cooperating with each other in the second position to fix movement of the mirror adjustment instrument relative to the carrier surrounded by and encased by the mirror cap such that the mirror adjustment instrument is immovable from the carrier in a direction transverse to the planar surface of the carrier surrounded by and encased by the mirror cap, while in the first position the mirror adjustment instrument and the carrier are clear of each other and the mirror adjustment instrument is movable in the direction transverse to the carrier surrounded by the mirror cap.

2. The mounting construction according to claim 1, wherein at least one of the mounting parts comprises a run-on surface.

3. The mounting construction according to claim 1, wherein the mirror adjustment instrument is moved from the first position to the second position through a translation movement.

4. The mounting construction according to claim 1, wherein the mirror adjustment instrument is provided with at least one projection which in the second position cooperates with a projection on the carrier.

5. The mounting construction according to claim 4, wherein the two cooperating projections in the second position prevent an axial displacement along an axis A of the mirror adjustment instrument, said axis A extending substantially transverse to the plane of the carrier.

6. The mounting construction according to claim 1, wherein the displacement of the minor adjustment instrument from the first position to the second position brings about an electrical connection between the mirror adjustment instrument and the carrier.

7. The mounting construction according to claim 1, wherein displacement of the mirror adjustment instrument from the first position to the second position locks a plug element fitted to the mirror adjustment instrument in its position.

8. An outside mirror unit comprising a mirror cap, a mirror comprising a reflecting surface, said mirror cap surrounding and encasing a carrier having a planar surface, a mirror adjustment instrument placed between the reflecting surface and the carrier for tilting the reflecting surface about a horizontal and vertical axis with regard to the mirror cap, and a mounting construction for mounting the mirror adjustment instrument to the planar surface of the carrier, the mounting construction comprising cooperating parts on the mirror adjustment instrument and the planar surface of the carrier, the mounting parts cooperating by rotation about an axis transverse to the carrier between a first position and a second position in a direction along the planar surface of the carrier, the mounting construction being rotated in a position in which the parts on the mirror adjustment instrument and the carrier cooperate, in which position the adjustment instrument is fixed with respect to the carrier in a direction transverse to the carrier.

9. The outside mirror unit according to claim 8, wherein the mirror is enclosed by the mirror cap in circumferential direction with an outer edge of the mirror being so closely adjacent to an inside of the mirror cap that the mirror adjustment member cannot from the second position to the first position such that the adjustment instrument can move in a direction transverse to the carrier.

10. The mounting construction according to claim 1, wherein the mirror adjustment instrument comprises driving mechanisms, said mounting construction further comprising a plug element fitted to the adjustment instrument for supplying the driving mechanisms with energy, said plug element being surrounded by and encased by the mirror cap.

11. The mounting construction according to claim 10, comprising locking means for locking the plug element against radial displacement away from the mirror adjustment instrument in the second position.

12. The mounting construction according to claim 11, wherein said locking means are arranged for locking the plug element against radial displacement away from the mirror adjustment instrument in the second position through rotation of the mirror adjustment instrument from the first position to the second position.

13. The mounting construction according to claim 12, wherein in the locking means comprise a projection having a surface, said plug element having a surface, wherein in the second position the surface of the projection cooperates with the surface of the plug element for locking the plug element against radial displacement away from the mirror adjustment instrument.

14. The mounting construction according to claim 1, wherein the reflecting surface is mounted on the mirror adjustment instrument substantially parallel to the planar surface of the carrier.

15. The outside mirror unit according to claim 8, wherein the mirror adjustment instrument comprises driving mechanisms, said mounting construction further comprising a plug element fitted to the adjustment instrument for supplying the driving mechanisms with energy, said plug element being surrounded by and encased by the mirror cap.

16. The outside mirror unit according to claim 15, comprising locking means for locking the plug element against radial displacement away from the mirror adjustment instrument in the position in which the parts on the minor adjustment instrument and the carrier cooperate.

17. The outside mirror unit according to claim 16, wherein the locking means comprise a projection having a surface, said plug element having a surface, wherein in the position in which the parts on the minor adjustment instrument and the carrier cooperate, the surface of the projection cooperates with the surface of the plug element for locking the plug element against radial displacement away from the mirror adjustment instrument.

18. The outside mirror unit according to claim 8, wherein the reflecting surface is mounted on the minor adjustment instrument substantially parallel to the planar surface of the carrier.

19. The mounting construction according to claim 8, wherein the minor adjustment instrument is moved from the first position to the second position through a translation movement.

20. The mounting construction of claim 1, further comprising a reflecting surface mounted on the mirror adjustment instrument with an outer edge of the reflecting surface after mounting on the mirror adjustment instrument being so closely adjacent to the inside of the mirror cap that the mirror adjustment instrument cannot move from the second position along the planar surface of the carrier after said mounting.

* * * * *